(12) United States Patent
Frick et al.

(10) Patent No.: US 11,086,373 B2
(45) Date of Patent: Aug. 10, 2021

(54) SYSTEMS AND METHODS FOR POWERING A POWER-OVER-ETHERNET POWERED DEVICE USING MULTIPLE POWER-OVER-ETHERNET SOURCING DEVICES

(71) Applicant: Extreme Networks, Inc., San Jose, CA (US)

(72) Inventors: John Kevin Frick, Apex, NC (US); Marc Jonathan Jacobs, Raleigh, NC (US)

(73) Assignee: Extreme Networks, Inc., San Jose, CA (US)

( * ) Notice: Subject to any disclaimer, the term of this patent is extended or adjusted under 35 U.S.C. 154(b) by 46 days.

(21) Appl. No.: 15/839,623

(22) Filed: Dec. 12, 2017

(65) Prior Publication Data

US 2019/0179389 A1     Jun. 13, 2019

(51) Int. Cl.
*G06F 1/26* (2006.01)
*H04L 12/10* (2006.01)
*G06F 1/28* (2006.01)

(52) U.S. Cl.
CPC ............. *G06F 1/266* (2013.01); *G06F 1/28* (2013.01); *H04L 12/10* (2013.01)

(58) Field of Classification Search
CPC ............. G06F 1/266; G06F 1/28; H04L 12/10
See application file for complete search history.

(56) References Cited

U.S. PATENT DOCUMENTS

| | | | |
|---|---|---|---|
| 8,674,546 B1 * | 3/2014 | Dix | H04L 12/10 307/65 |
| 2006/0053324 A1 * | 3/2006 | Giat | H04L 12/10 713/300 |

(Continued)

OTHER PUBLICATIONS

Draft Standard for Ethernet Amendment: Physical Layer and Management Parameters for DTE Power via MDI over 4-Pair, IEEE P802.3, Prepared by the LAN/MAN Standards Committee of the IEEE Computer Society, IEEE P802.3bt$^{tm}$/D2.1, Oct. 7, 2016, 258 pages.

(Continued)

*Primary Examiner* — Jaweed A Abbaszadeh
*Assistant Examiner* — Gayathri Sampath
(74) *Attorney, Agent, or Firm* — Sterne, Kessler, Goldstein & Fox P.L.L.C.

(57) ABSTRACT

Systems, methods, and apparatuses are provided herein for implementing a PoE system comprising a plurality of power sourcing equipment that power a single powered device. Control circuitry may determine the power necessary to operate a powered device in a first power mode, and may cause the powered device to draw, from a first power sourcing device, to a first port of the powered device, a first wattage. The powered device may draw, from a second power sourcing device, to a second port of a powered device, a second wattage, where a sum of the first and second wattage equals the amount of power necessary to operate in the first power mode, wherein a first isolation boundary isolates the first power sourcing equipment, the first Ethernet link, and the first port, and wherein a second isolation boundary isolates the second power sourcing equipment, the second Ethernet link, and the second port.

21 Claims, 5 Drawing Sheets

(56) References Cited

U.S. PATENT DOCUMENTS

| | | | | |
|---|---|---|---|---|
| 2007/0284946 A1* | 12/2007 | Robbins | ............ | H02J 1/10 |
| | | | | 307/18 |
| 2008/0054720 A1* | 3/2008 | Lum | ............ | H02J 1/10 |
| | | | | 307/52 |
| 2010/0031066 A1* | 2/2010 | Geiger | ............ | H04L 12/10 |
| | | | | 713/300 |
| 2011/0125341 A1* | 5/2011 | Heath | ............ | H04L 12/10 |
| | | | | 700/295 |
| 2012/0317426 A1* | 12/2012 | Hunter, Jr. | ............ | G06F 1/28 |
| | | | | 713/300 |
| 2014/0084691 A1* | 3/2014 | Ranzato | ............ | H02J 1/00 |
| | | | | 307/60 |
| 2015/0019884 A1 | 1/2015 | Huff et al. | | |
| 2016/0282894 A1* | 9/2016 | Hazani | ............ | H04W 72/044 |

OTHER PUBLICATIONS 802.3 at IEEE Standard for Ethernet—Section Two, Copyright 2012 IEEE, 132 pages.

\* cited by examiner

SYSTEMS AND METHODS FOR POWERING A POWER-OVER-ETHERNET POWERED DEVICE USING MULTIPLE POWER-OVER-ETHERNET SOURCING DEVICES

BACKGROUND

Power-over-Ethernet (PoE) describes a technology where devices are powered through an Ethernet connection, rather than through a conventional power connection. Most Powered Devices (PD) that are powered using PoE are compliant to one of the following Institute for Electrical and Electronics Engineers (IEEE) standards: 802.3af, 802.3at, or 802.3bt. In some instances, it is beneficial for PDs to pull power from two or more PoE interfaces. Related art PoE systems, however, do not address PDs pulling power from multiple interfaces that are on disparate Power Sourcing Equipment (PSE).

SUMMARY

Systems, methods, and apparatuses are provided herein for implementing a Power-over-Ethernet system comprising a plurality of power sourcing equipment that power a single powered device. To this end and others, in some aspects of the disclosure, control circuitry of a powered device may determine an amount of power necessary to operate a powered device in a first power mode (e.g., 100 W). The control circuitry may cause the powered device to draw, from a first power sourcing device, to a first port of the powered device, over a first Ethernet link, a first wattage (e.g., 40 W), and may draw, from a second power sourcing device, to a second port of a powered device, over a second Ethernet link, a second wattage (e.g., 60 W). A sum of the first wattage and the second wattage may equal the amount of power necessary to operate in the first power mode. A first isolation boundary may isolate the first power sourcing equipment, the first Ethernet link, and the first port, and a second isolation boundary may isolate the second power sourcing equipment, the second Ethernet link, and the second port.

The control circuitry may determine a maximum first wattage that can be sourced from the first power sourcing device (e.g., 50 W), and may determine a maximum second wattage that can be sourced from the second power sourcing device (e.g., 80 W). The control circuitry may determine whether each of the maximum first wattage and the maximum second wattage exceed half of the amount of power necessary to operate in the first power mode. In response to determining that each of the maximum first wattage and the maximum second wattage exceed half of the amount of power necessary to operate in the first power mode, the control circuitry may assign the first wattage and the second wattage to each equal half the amount of power necessary to operate in the first power mode. For example, for load balancing purposes, the control circuitry may have a 50 W and 80 W PSE each deliver 50 W of power to a PD that requires 100 W of power.

In some embodiments, the control circuitry may determine an amount of power necessary to operate the powered device in a second power mode (e.g., a high power mode, where the first mode is a low power mode), and may determine a maximum first wattage that can be sourced from the first power sourcing device and a maximum second wattage that can be sourced from the second power sourcing device. The control circuitry may then determine whether a sum of the maximum first wattage and the maximum second wattage equals or exceeds the amount of power necessary to operate the powered device in the second power mode. In response to determining that the sum of the maximum first wattage and the maximum second wattage does not equal or exceed the amount of power necessary to operate the powered device in the second power mode, the control circuitry may cause the powered device to continue to operate in the first power mode. For example, if a PD requires 200 W to operate in a high power mode, and 100 W to operate in a low power mode, and the PSEs connected to the PD supply 50 W and 80 W of power, then the control circuitry would determine that the sum of the available power is 130 W, which is insufficient to operate the PD in a high power mode.

In response to determining that the sum of the maximum first wattage and the sum of the maximum second wattage does equal or exceed the amount of power necessary to operate the powered device in the second power mode, the control circuitry may cause the powered device to draw, from, collectively, the first power sourcing device and the second power sourcing device, the amount of power necessary to operate the powered device in the second power mode. The control circuitry may transition the powered device from the first power mode to the second power mode.

In some embodiments, while continuing to operate the powered device in the first power mode, and further in response to determining that the sum of the maximum first wattage and the maximum second wattage does not equal or exceed the amount of power necessary to operate the powered device in the second power mode, the control circuitry may determine that the powered device is additionally coupled to third power sourcing equipment by way of a third Ethernet link that couples the third power sourcing equipment and a third port of the powered device. The control circuitry may determine a maximum third wattage that can be sourced from the third power sourcing device, and may then determine whether a sum of the maximum first wattage, maximum second wattage, and maximum third wattage is less than the second amount of input wattage required to operate in the second power mode. In response to determining that the sum of the maximum first wattage, maximum second wattage, and maximum third wattage is not less than the second amount of input wattage required to operate in the second power mode, the control circuitry may cause the powered device to draw wattage from the third power sourcing device, and may transition the powered device from the first power mode to the second power mode.

The control circuitry may determine that the second Ethernet link has failed. The control circuitry may determine, in this scenario, whether the powered device requires more wattage than is available from the first power sourcing device, and, in response to determining that the powered device does not require more wattage than is available from the first power sourcing device, the control circuitry may cause the powered device to draw the amount of power necessary to operate in the first power mode from the first power sourcing device. For example, if PSE 1 offers 80 W of power, and PSE 2 offers 40 W of power, and the PD requires 80 W to operate, then in the event of a failure of PSE 2, the control circuitry may draw all 80 W of power from PSE 1 and continue to keep the PD in an operational state.

In some embodiments, the first power mode is a low-power mode, and the powered device was operating in a high-power mode before the second Ethernet link failed. In response to determining that the powered device does require more wattage than the first wattage, the control circuitry may determine whether the low-power mode requires more wattage than the amount of power necessary to operate in the first power mode. In response to determining that the low-power mode does not require more wattage than the amount of power necessary to operate in the first power mode, the control circuitry may cause the powered device to draw an amount of wattage from the first power sourcing equipment to the powered device that is required for the powered device to operate in the low-power mode.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

In some aspects of the disclosure, systems, methods, and apparatuses are described herein for enabling a PD to draw power from multiple PSEs. In order for a PD to draw power from multiple PSEs, an isolation boundary must exist between PoE input voltages and external connections. As used herein, the term "isolation boundary" is a boundary that isolates a threshold amount of voltage between PoE input voltages and any external connections, for the purpose of preventing interference with interactions of input ports and any points of non-isolation. Examples of non-isolation include connecting an input voltage rail (power or return) to frame ground, connecting power or return of redundant ports to one another, or connecting one of the input voltage rails to an output voltage (or ground). While any level of isolation is within the scope of this disclosure, as described by the IEEE 802.3af, 802.3at, and 802.3bt standards, an isolation boundary should have at least 1500V between the PoE input voltages and any external connections. An isolation boundary may be implemented using any form of insulator.

Figure 1:
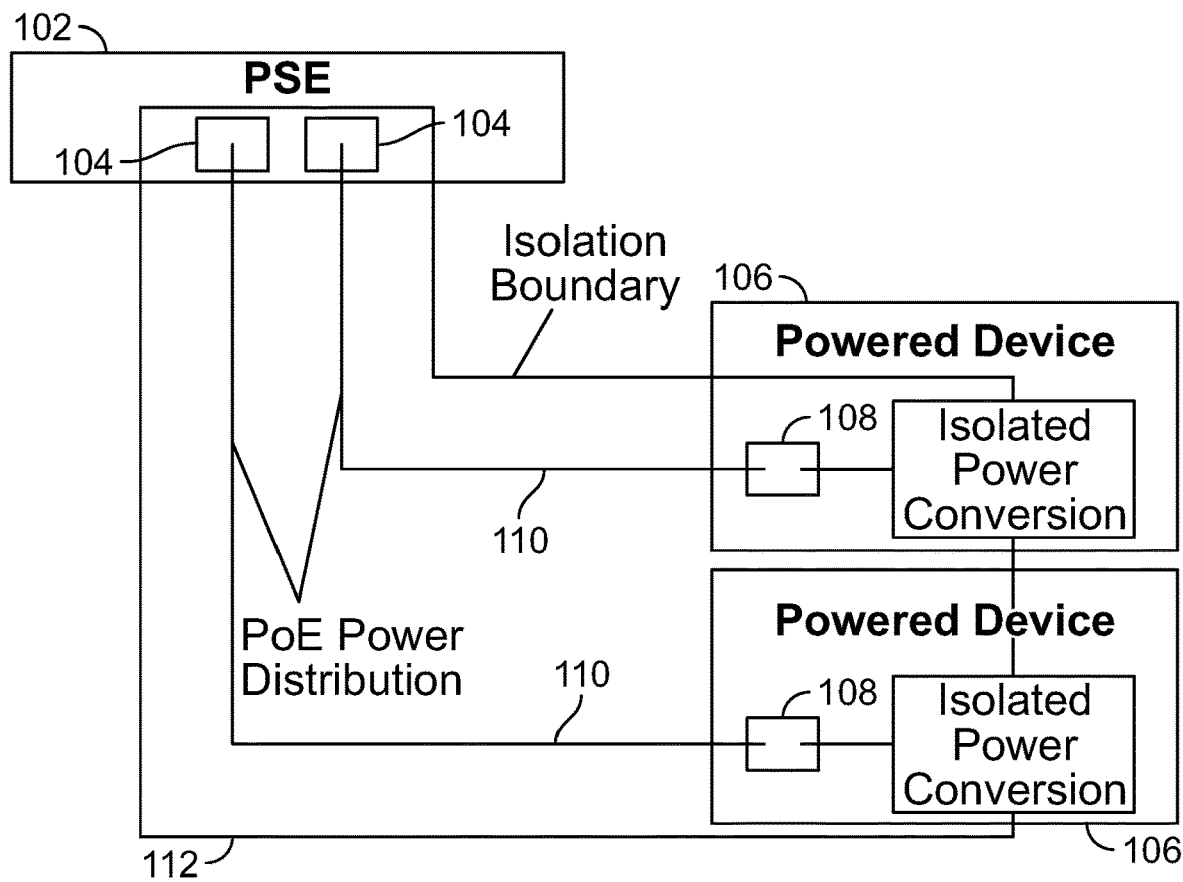
FIG. 1 depicts an illustrative system implementing an isolation boundary for powering multiple PDs using multiple PSE interfaces from a same PSE, in accordance with some embodiments of the disclosure.

FIG. 1 depicts an illustrative system implementing an isolation boundary for powering multiple PDs using multiple PSE interfaces from a same PSE, in accordance with some embodiments of the disclosure. PSE 102 uses power outputs 104 to transmit power over Ethernet links 110 to input ports 108 of powered devices 106. Isolation boundary 112 isolates all elements of FIG. 1 from any external connections.

Figure 2:
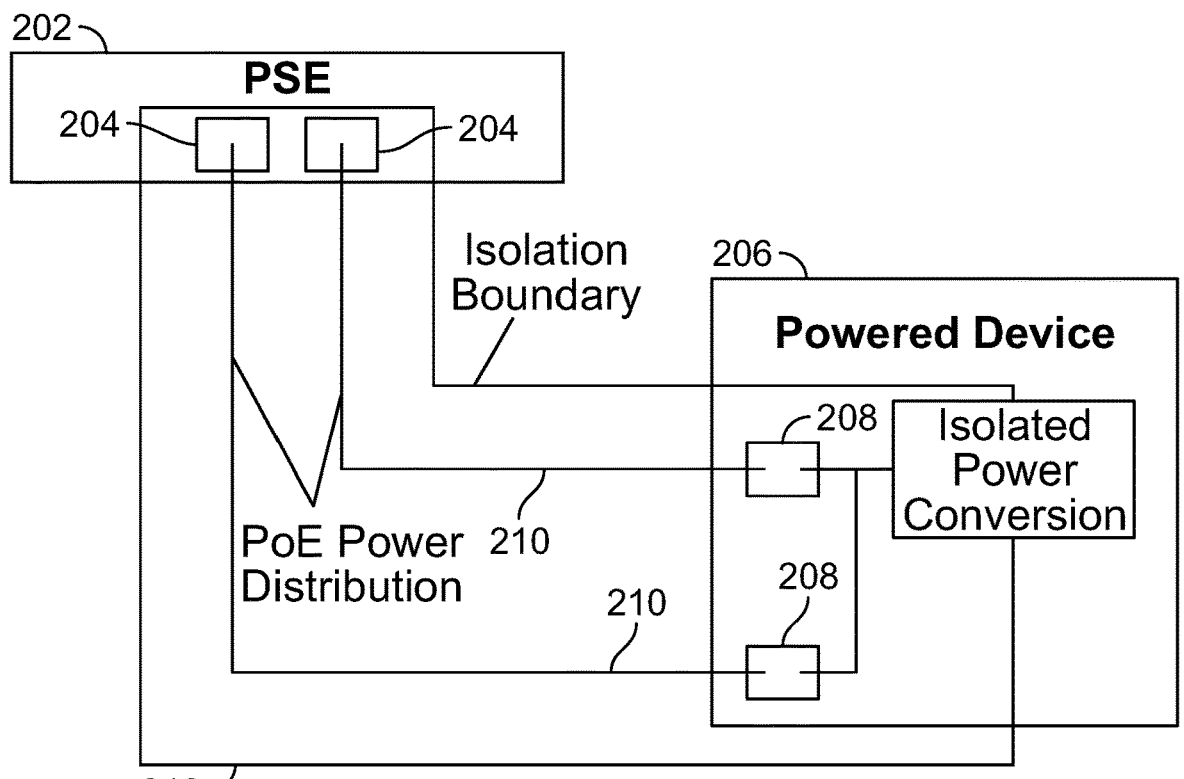
FIG. 2 depicts an illustrative system implementing an isolation boundary for powering a single PD using multiple PSE interfaces from a same PSE, in accordance with some embodiments of the disclosure.

FIG. 2 depicts an illustrative system implementing an isolation boundary for powering a single PD using multiple PSE interfaces from a same PSE, in accordance with some embodiments of the disclosure. Similar to FIG. 1, PSE 202 uses power outputs 204 to transmit power over Ethernet links 210 to input ports 108 of powered device 106. As depicted in FIG. 2, isolated power conversion occurs in the powered device before the isolation boundary. However, in many cases, it is only acceptable to merge power within isolation boundary 212 if power comes from a same PSE 202. If power comes from two separate sources, isolation must be maintained between the separate sources, and thus the configuration of FIG. 2 would not work if power outputs 204 were implemented in two different PSEs.

Figure 3:
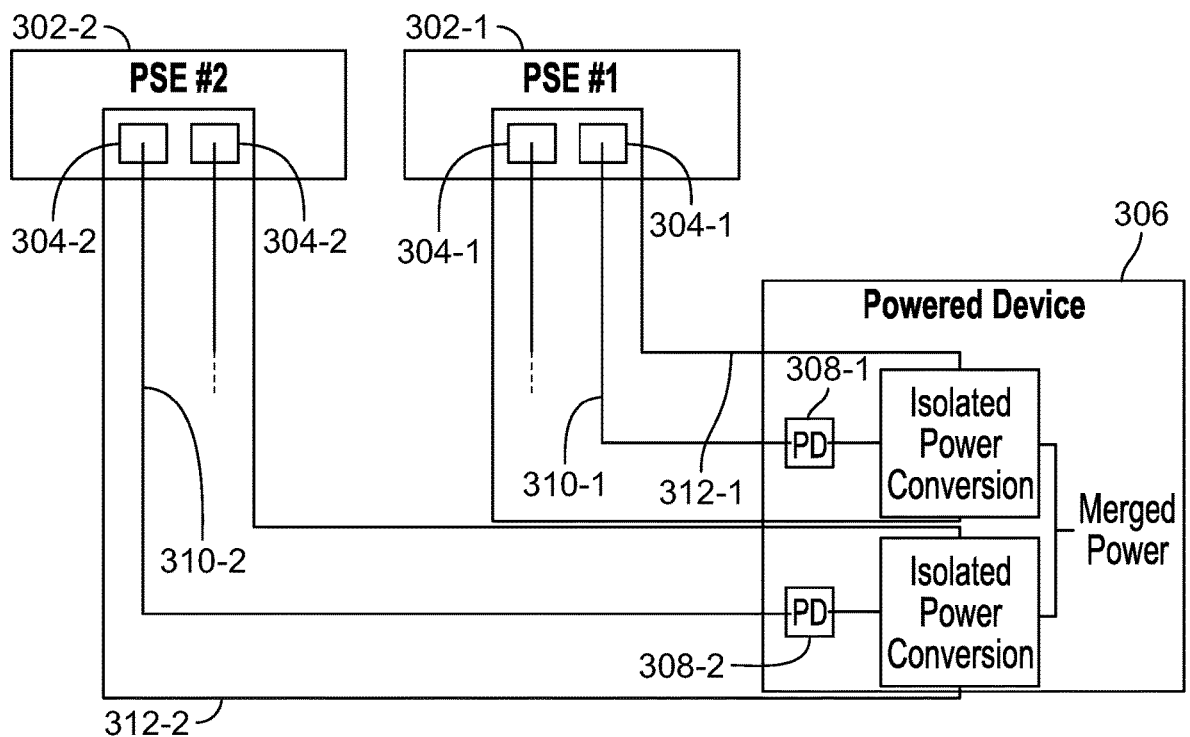
FIG. 3 depicts an illustrative system implementing an isolation boundary for powering a single PD using multiple PSEs, in accordance with some embodiments of the disclosure.

FIG. 3 depicts an illustrative system implementing an isolation boundary for powering a single PD using multiple PSEs, in accordance with some embodiments of the disclosure. In FIG. 3, two separate power sources, 302-1 and 302-2, respectfully power powered device 306 using power outputs 304-1 and 304-2. Power is transmitted from power outputs 304-1 and 304-2 to input ports 308 of powered device 306 by way of Ethernet links 310-1 and 310-2, respectively. Critically, two separate isolation boundaries 312-1 and 312-2 isolate the power conversion for power provided from PSE 304-1 and PSE 304-2, respectively. This is because, when power comes from two separate sources, isolation must be maintained between them. If isolation is not maintained (e.g., due to a short circuit occurring, a cabling error, or the like), then failure can occur. Moreover, if PSEs 304-1 and 304-2 output voltages at different voltage levels, then system failure could occur if isolation boundaries 312-1 and/or 312-2 were not present.

Figure 4:
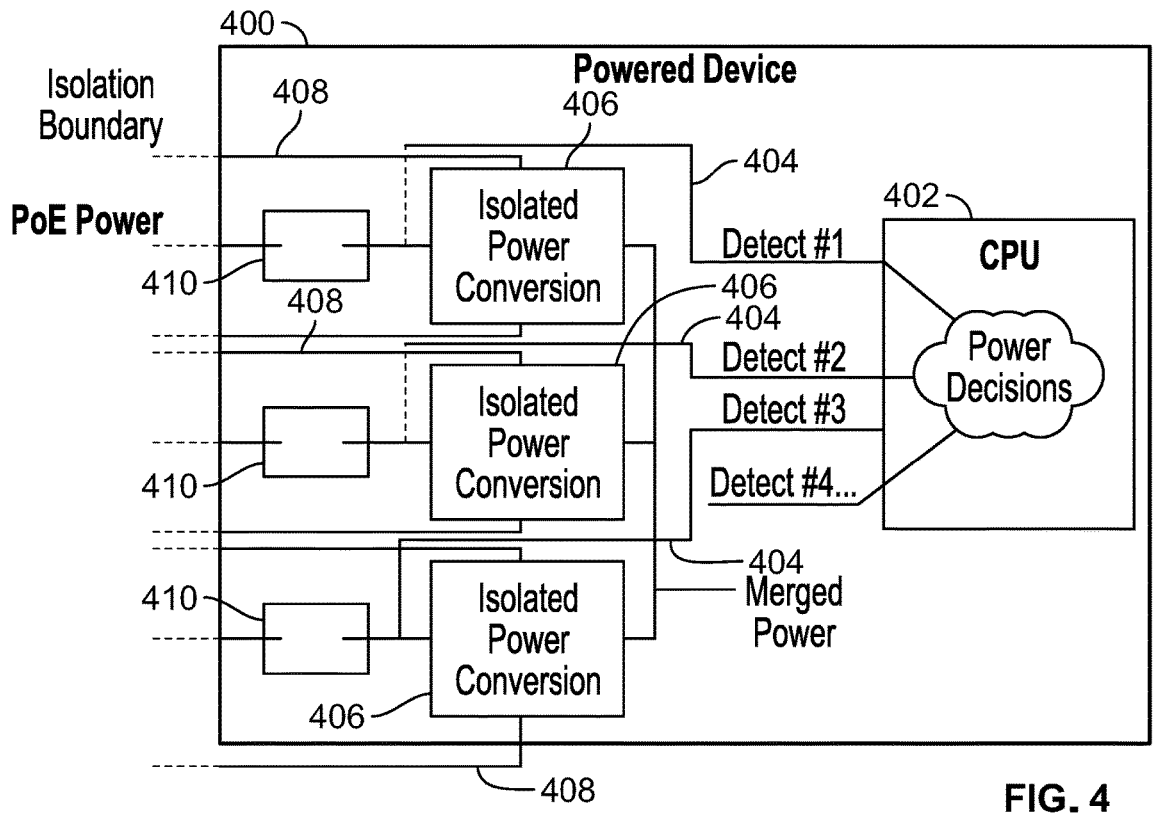
FIG. 4 depicts an illustrative powered device with a control circuitry for, among other things, making power decisions, in accordance with some embodiments of the disclosure.

FIG. 4 depicts an illustrative powered device with control circuitry for, among other things, making power decisions, in accordance with some embodiments of the disclosure. In FIG. 4, powered device 400 includes control circuitry 402. Control circuitry 402 is configured to detect, using detection circuitry 404, PoE power source capacity from PSEs (not depicted) that are operably coupled to powered device 400 by way of interfaces 410. Interfaces 410 are coupled to isolated power converters 406. Each interface 410 and isolated power converter 406 is isolated from each other interface 410 and isolated power converter 406 by way of isolation boundaries 408.

As explained above, control circuitry 402 may use detection circuitry 404 to detect all potential input power available to powered device 400 from PSEs that are coupled to powered device 400. Control circuitry 402 may then command interfaces 410 to draw power at different levels from the PSEs to which interfaces 410 are connected in order to optimize performance.

To this end, control circuitry 402 may detect individual PoE power source capacity from each PSE that is coupled to an interface 410. Additionally, powered device 400 may determine a number of sources that are coupled to interface 410. Each isolated power circuit (e.g., circuits within isolation boundaries 408) may then share power. Control circuitry 402 may cause the power sharing to be performed in a manner that load balances power draw from each PSE and otherwise regulates power to powered device 400. As an example of load balancing, if a PD requires 100 W, and four PSEs are connected to the PD with a maximum output of 25 W, 50 W, 75 W, and 100 W, all four PSEs may provide an equal amount of power—25 W—to the PD. As another example of load balancing, power output may be determined based on a PSE's maximum power output. For example, if there are 3 PSEs powering a 100 W device, with a maximum respective power output of 25 W, 75 W, and 100 W, the control circuitry may perform load balancing by having each PSE provide half of its maximum power (e.g., 12.5 W, 37.5 W, and 50 W) to the PD. Any form of load balancing may be commanded by the control circuitry. Power sharing may occur through any known sharing mechanism, such as droop sharing or active current sharing.

Control circuitry 402 may detect that a PSE connected to an interface 410 that powered device 400 is drawing power from has stopped providing power (e.g., due to disconnect, failure, or PSE configuration). Control circuitry 402 may responsively take action to ensure powered device 400 continues to draw enough power by way of interfaces 410 to operate.

In some embodiments, control circuitry 402 may take such action by determining whether powered device 400 can draw sufficient power from remaining PSEs to which powered device 400 is connected. For example, if powered device 400 requires 90 W to be operational, and if powered device is connected to PSE 1 which has a maximum output of 50 W, PSE 2, which has a maximum output of 40 W, and PSE 3 which has a maximum output of 30 W, powered device 400 may be powered by drawing 30 W from each of PSE 1, PSE 2, and PSE 3. If PSE 3 were to fail, control circuitry 400, in response to detecting the failure, may continue to be fully operational by drawing 50 W from PSE 1, and 40V from PSE 2, thus resulting in powered device 400 drawing the requisite 90 W of power.

In some embodiments, control circuitry 402 may take action to ensure powered device 400 continues to draw enough power by way of interfaces 410 to operate by switching to a low power mode when a PSE failure is detected. Following from the example above, powered device 400 may require 90 W to operate in a high power mode, and may require 50 W to operate in a low power mode. Thus, if PSE 1 were to fail, powered device 400 may responsively switch to drawing 25 W from PSE 2 and from PSE 3, and may thus continue to operate in low power mode by switching the amount of power powered device 400 draws from the PSEs that powered device 400 is still connected to. Similarly, if PSE 1 were to be detected as being again operational, control circuitry 402 may cause powered device 400 to again draw power from PSE 1 and transition back to high power mode.

Figure 5:
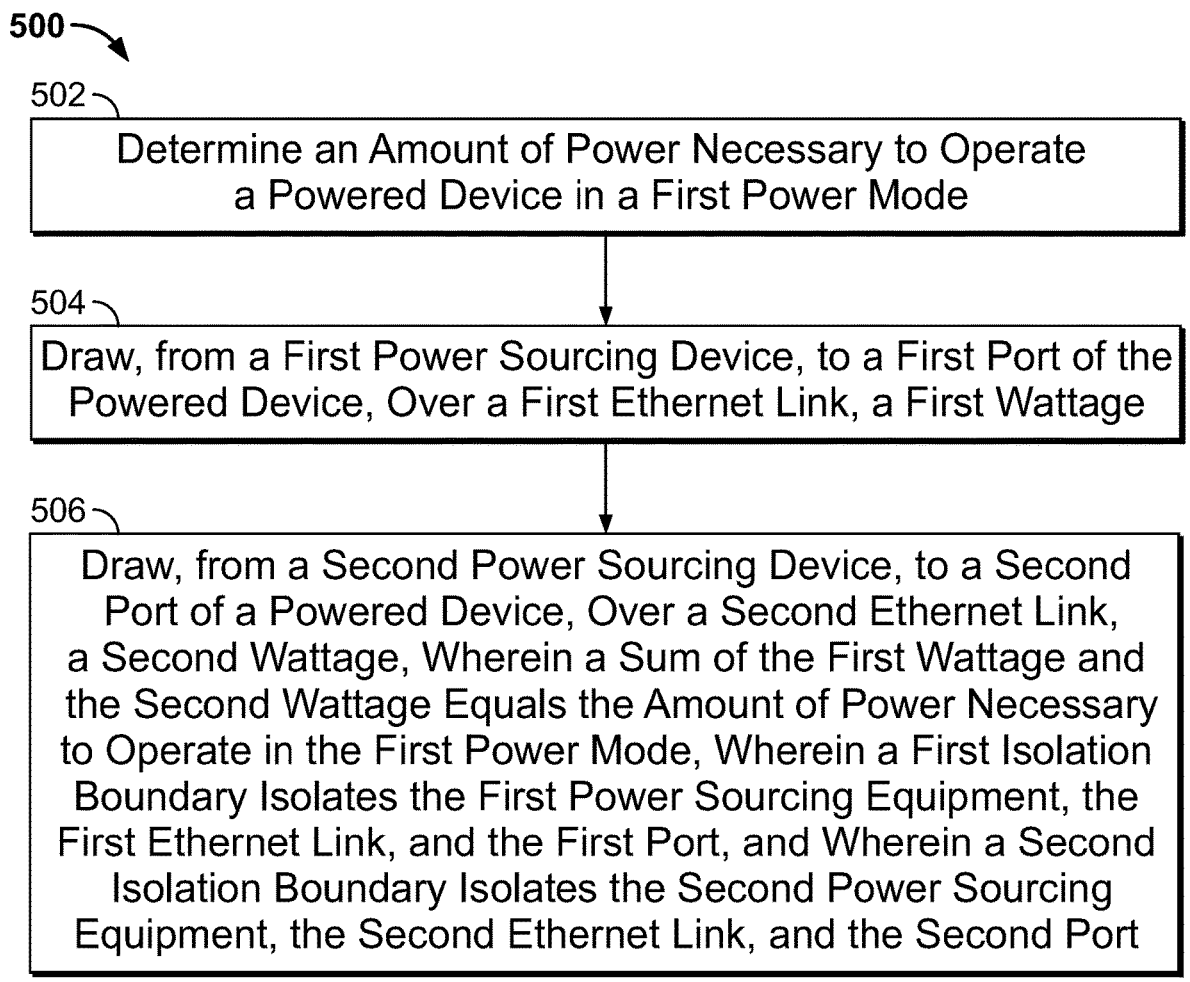
FIG. 5 depicts an illustrative flowchart of a process for using a PoE system to power a powered device by drawing power from multiple PSEs, in accordance with some embodiments of the disclosure.

FIG. 5 depicts an illustrative flowchart of a process for using a PoE system to power a powered device by drawing power from multiple PSEs, in accordance with some embodiments of the disclosure. Process 500 begins at 502, where control circuitry (e.g., control circuitry 402) determines an amount of power necessary to operate a powered device (e.g., powered device 400) in a first power mode (e.g., a low-power mode). At 504, the control circuitry causes the powered device to draw, from a first power sourcing device (e.g., PSE 302-1), to a first port of the powered device (e.g., 308-1), over a first Ethernet link (e.g., 310-1), a first wattage.

At 506, the control circuitry causes the powered device to draw, from a second power sourcing device (e.g., PSE 302-2), to a second port of a powered device (e.g., 308-2), over a second Ethernet link (e.g., 310-2), a second wattage, wherein a sum of the first wattage and the second wattage equals the amount of power necessary to operate in the first power mode, wherein a first isolation boundary (e.g., 312-1) isolates the first power sourcing equipment (e.g., 302-1), the first Ethernet link (e.g., 310-1), and the first port (e.g., 308-1), and wherein a second isolation boundary (e.g., 312-2) isolates the second power sourcing equipment (e.g., 302-2), the second Ethernet link (e.g., 310-2), and the second port (e.g., 308-2).

Figure 6:
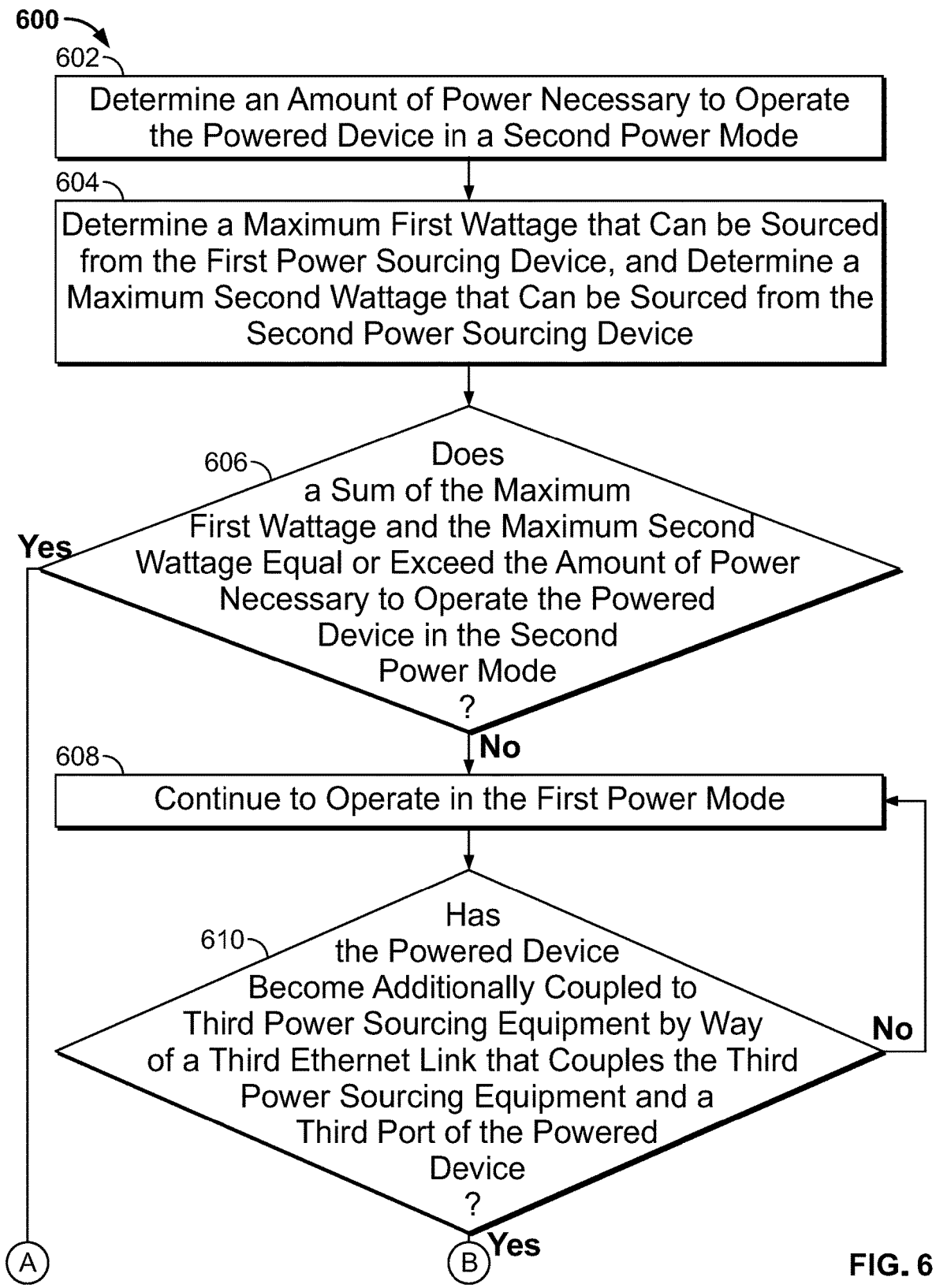
FIG. 6 depicts an illustrative flowchart of a process for determining whether to operate a powered device in a first power mode or a second power mode based on power available from multiple PSEs that are coupled to a powered device by way of PoE links, in accordance with some embodiments of the disclosure.
Figure 6:
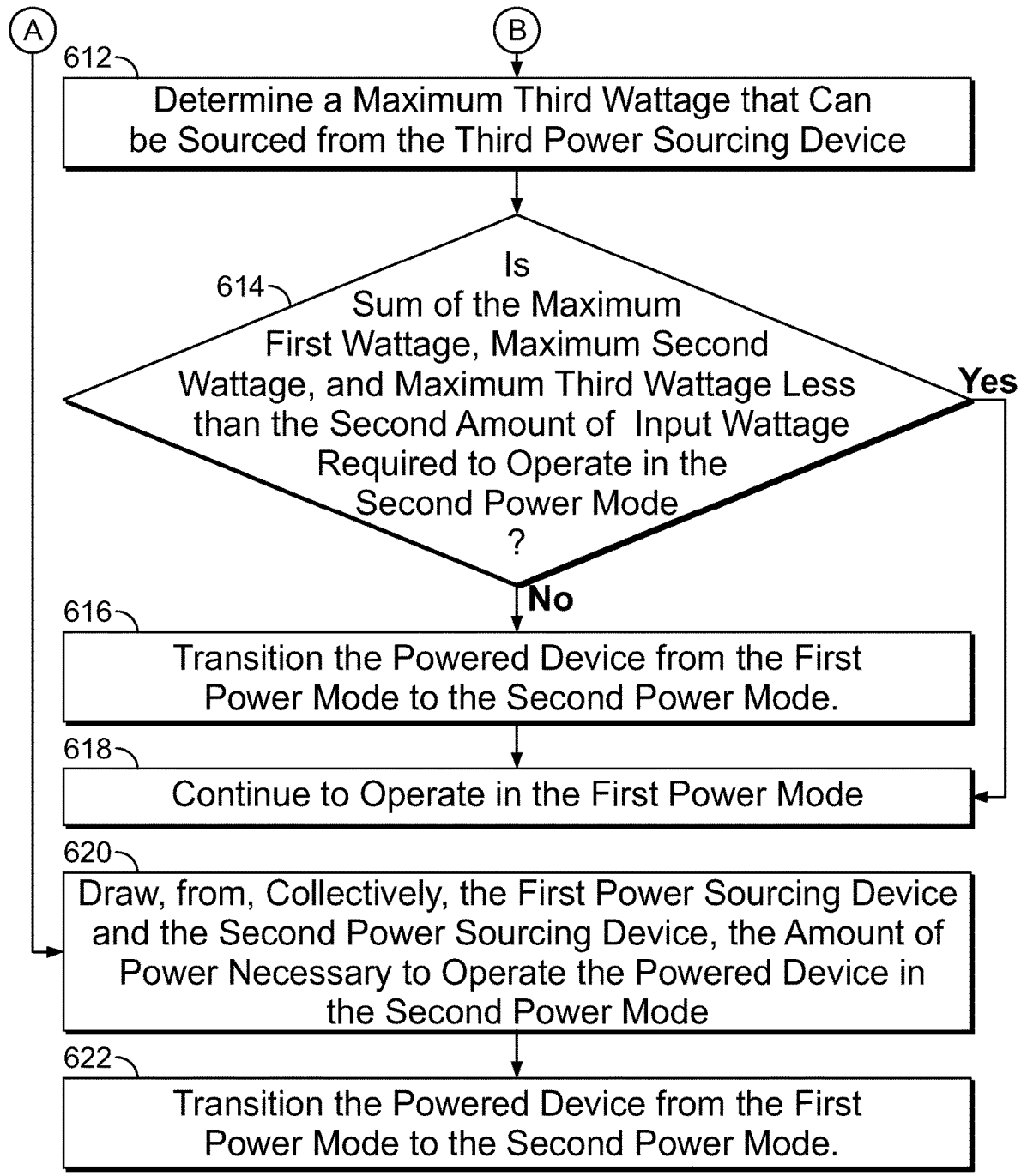

FIG. 6 depicts an illustrative flowchart of a process for determining whether to operate a powered device in a first power mode or a second power mode based on power available from multiple PSEs that are coupled to a powered device by way of PoE links, in accordance with some embodiments of the disclosure. Process 600 begins at 602, where control circuitry (e.g., control circuitry 402) determines an amount of power necessary to operate the powered device (e.g., powered device 400) in a second power mode (e.g., a high power mode). At 604, the control circuitry determines a maximum first wattage that can be sourced from the first power sourcing device (e.g., PSE 302-1), and determines a maximum second wattage that can be sourced from the second power sourcing device (e.g., PSE 302-2).

At 606, the control circuitry determines whether a sum of the maximum first wattage and the maximum second wattage equals or exceeds the amount of power necessary to operate the powered device in the second power mode. If the determination is in the negative, then process 600 continues to 608, where the control circuitry continues to operate the powered device in the first power mode (e.g., a low power mode). If the determination is in the affirmative, then process 600 continues to 620, where the control circuitry causes the powered device to draw, from, collectively, the first power sourcing device and the second power sourcing device, the amount of power necessary to operate the powered device in the second power mode, and at 622, the control circuitry transitions the powered device from the first power mode to the second power mode.

Following from 608, where the powered device is caused to operate in the first power mode (e.g., a low power mode), process 600 continues to 610, where the control circuitry determines whether the powered device has become additionally coupled to third power sourcing equipment by way of a third Ethernet link that couples the third power sourcing equipment and a third port of the powered device. If the determination is in the negative, process 600 reverts to 608. If the determination is in the affirmative, process 600 continues to 612, where the control circuitry determines a maximum third wattage that can be sourced from the third power sourcing device.

At 614, the control circuitry determines whether the sum of the maximum first wattage, maximum second wattage, and maximum third wattage is less than the second amount of input wattage required to operate in the second power mode. If the determination is in the negative, process 600 goes to 616, where the control circuitry transitions the powered device from the first power mode to the second power mode (e.g., from a low power mode to a high power mode). If the determination is in the affirmative, process 600 continues to 618, where the control circuitry causes the powered device to continue to operate in the first power mode.

The foregoing describes systems, methods, and apparatuses for configuring and implementing an environment where a PD is powered by way of multiple PSEs. The above-described embodiments of the present disclosure are presented for the purposes of illustration and not of limitation. Furthermore, the present disclosure is not limited to a particular implementation. For example, one or more steps of the methods described above may be performed in a different order (or concurrently) and still achieve desirable results. In addition, the disclosure may be implemented in hardware, such as on an application-specific integrated circuit (ASIC) or on a field-programmable gate array (FPGA). The disclosure may also be implemented in software by, for example, encoding transitory or non-transitory instructions for performing the process discussed above in one or more transitory or non-transitory computer-readable media.

While some portions of this disclosure may make reference to "convention," or "related art," any such reference is merely for the purpose of providing context to the invention (s) of the instant disclosure, and does not form any admission, express or implied, as to what constitutes the state of the prior art. As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

While the term "wattage" is used throughout this disclosure, and examples of implementation are given in terms of "watts," this is merely exemplary; any unit of power output may interchangeably be used in place of these terms. Similarly, while the term "voltage" is used throughout this disclosure, and examples of implementation are given in terms of "volts," this is merely exemplary; any unit of electrical potential energy may interchangeably be used in place of these terms.

The figures referred to herein are merely exemplary, and are not limiting examples of the disclosure. For example, while FIG. 3 depicts a PD being coupled to two PSEs using two ports, any number of ports may be used to couple a PD to any number of PSEs. Similarly, in FIG. 4, any number of interfaces 410 may be used to connect a PD to any number of PSEs.

What is claimed is:

1. A method, comprising:
    detecting, at a powered device, an amount of power necessary to operate the powered device in a first power mode;
    detecting, at the powered device, a maximum first wattage that can be sourced from a first power sourcing device over a first Ethernet link to a first port of the powered device;
    detecting, at the powered device, a maximum second wattage that can be sourced from a second power sourcing device over a second Ethernet link to a second port of the powered device;
    drawing, by the powered device from the first power sourcing device to the first port of the powered device and over the first Ethernet link, a first wattage based on the detected maximum first wattage and the detected maximum second wattage;
    drawing, by the powered device from the second power sourcing device to the second port of the powered device and over the second Ethernet link, a second wattage based on the detected maximum first wattage and the detected maximum second wattage;
    detecting, at the powered device operating in the first power mode, a coupling of a third power sourcing device over a third Ethernet link to a third port of the powered device;
    detecting, at the powered device, a maximum third wattage that can be sourced from the third power sourcing device over the third Ethernet link to the third port of the powered device; and
    determining, by the powered device, a sum of the detected maximum first wattage, the detected maximum second wattage, and the detected maximum third wattage is greater than an amount of power necessary to operate the powered device in a second power mode; and
    in response to determining that the sum of the detected maximum first wattage, the detected maximum second wattage, and the detected maximum third wattage is greater than the amount of power necessary to operate the powered device in the second power mode:
        drawing, by the powered device from the third power sourcing device to the third port of the powered device and over the third Ethernet link, a third wattage; and
        transitioning the powered device while operating in the first power mode to the second power mode,
    wherein a first isolation boundary collectively isolates a first isolated power converter, the first power sourcing device, the first Ethernet link, and the first port from a second isolated power converter, the second power sourcing device, the second Ethernet link, and the second port, and wherein a second isolation boundary collectively isolates the second isolated power converter, the second power sourcing device, the second Ethernet link, and the second port from the first isolated power converter, the first power sourcing device, the first Ethernet link, and the first port.

2. The method of claim 1, further comprising:
    determining, by the powered device, whether each of the detected maximum first wattage and the detected maximum second wattage exceeds half of the detected amount of power necessary to operate in the first power mode; and
    in response to determining that each of the detected maximum first wattage and the detected maximum second wattage exceeds half of the detected amount of power necessary to operate in the first power mode, assigning, by the powered device, the first wattage and the second wattage to each equal half of the detected amount of power necessary to operate the powered device in the first power mode.

3. The method of claim 1, further comprising:
    detecting, at the powered device, the amount of power necessary to operate the powered device in the second power mode.

4. The method of claim 1, further comprising:
    determining, by the powered device, that the second Ethernet link has failed;
    determining, by the powered device, that the powered device when operating in the first power mode does not require more wattage than is available from the first power sourcing device in response to the determination that the second Ethernet link failed; and
    in response to determining that the powered device when operating in the first power mode does not require more wattage than is available from the first power sourcing device, drawing, by the powered device, the amount of power necessary to operate the powered device in the first power mode exclusively from the first power sourcing device.

5. The method of claim 1, wherein the first power mode is a low-power mode and the second power mode is a high-power mode, and wherein the method further comprises:
  determining, by the powered device, that the second Ethernet link has failed, wherein the powered device was operating in the second power mode before the second Ethernet link failed;
  determining, by the powered device, that the powered device when operating in the second power mode does require more wattage than the detected maximum first wattage;
  determining, by the powered device, that the powered device when operating in the first power mode does not require more wattage than the detected maximum first wattage; and
  in response to determining that the powered device when operating in the first power mode does not require more wattage than the detected maximum first wattage, drawing, by the powered device, an amount of wattage from the first power sourcing device to the powered device that is required for the powered device to operate in the first power mode.

6. A system, comprising:
  a powered device; and
  control circuitry, implemented at the powered device, that is configured to:
  detect an amount of power necessary to operate the powered device in a first power mode;
  detect a maximum first wattage that can be sourced from a first power sourcing device over a first Ethernet link to a first port of the powered device;
  detect a maximum second wattage that can be sourced from a second power sourcing device over a second Ethernet link to a second port of the powered device;
  draw, from the first power sourcing device to the first port of the powered device and over the first Ethernet link, a first wattage;
  draw, from the second power sourcing device to the second port of the powered device and over the second Ethernet link, a second wattage;
  detect, while the powered device is operating in the first power mode, a coupling of a third power sourcing device over a third Ethernet link to a third port of the powered device;
  detect a maximum third wattage that can be sourced from the third power sourcing device over the third Ethernet link to the third port of the powered device; and
  determine a sum of the detected maximum first wattage, the detected maximum second wattage, and the detected maximum third wattage is greater than an amount of power necessary to operate the powered device in a second power mode; and
  in response to determining that the sum of the detected maximum first wattage, the detected maximum second wattage, and the detected maximum third wattage is greater than the amount of power necessary to operate the powered device in the second power mode:
    draw, from the third power sourcing device to the third port of the powered device and over the third Ethernet link, a third wattage; and
    transition the powered device while operating in the first power mode to the second power mode,
  wherein a first isolation boundary collectively isolates a first isolated power converter, the first power sourcing device, the first Ethernet link, and the first port from a second isolated power converter, the second power sourcing device, the second Ethernet link, and the second port, and wherein a second isolation boundary collectively isolates the second isolated power converter, the second power sourcing device, the second Ethernet link, and the second port from the first isolated power converter, the first power sourcing device, the first Ethernet link, and the first port.

7. The system of claim 6, wherein the control circuitry is further configured to:
  determine that each of the maximum first wattage and the maximum second wattage exceeds half of the amount of power necessary to operate in the first power mode; and
  in response to determining that each of the maximum first wattage and the maximum second wattage exceed half of the detected amount of power necessary to operate in the first power mode, assign the first wattage and the second wattage to each equal half the detected amount of power necessary to operate the powered device in the first power mode.

8. The system of claim 6, wherein, the control circuitry is further configured to: detect the amount of power necessary to operate the powered device in the second power mode.

9. The system of claim 6, wherein the control circuitry is further configured to:
  determine that the second Ethernet link has failed;
  determine the powered device when operating in the first power mode does not require more wattage than is available from the first power sourcing device in response to the determination that the second Ethernet link failed; and
  in response to determining that the powered device when operating in the first power mode does not require more wattage than is available from the first power sourcing device, draw the amount of power necessary to operate the powered device in the first power mode exclusively from the first power sourcing device.

10. A system for implementing a Power-over-Ethernet system comprising a plurality of power sourcing equipment that power a powered device, the system comprising:
  first power sourcing device that outputs up to a first wattage;
  second power sourcing device that outputs up to a second wattage;
  a third power sourcing device comprising a third wattage;
  a first Ethernet link that couples the first power sourcing device and a first port of the powered device;
  a second Ethernet link that couples the second power sourcing device and a second port of the powered device;
  a third Ethernet link that couples the third power sourcing device and a third port of the powered device;
  a first isolation boundary that collectively isolates a first isolated power converter, the first power sourcing device, the first Ethernet link, and the first port from a second isolated power converter, the second power sourcing device, the second Ethernet link, and the second port;
  a second isolation boundary that collectively isolates the second isolated power converter, the second power sourcing device, the second Ethernet link, and the second port from the first isolated power converter, the first power sourcing device, the first Ethernet link, and the first port; and
  wherein the powered device requires a first amount of input wattage to operate in a first power mode, the powered device requires a second amount of input wattage to operate in a second power mode, and the powered device comprises control circuitry configured to;
 determine a first power wattage to draw from the first power sourcing device;
 determine a second power wattage to draw from the second power sourcing device;
 determine the first power wattage and the second power wattage based on an amount of drawn wattage required to equal the first amount of input wattage to operate in the first power mode;
 determine that a sum of the first power wattage and the second power wattage is less than the second amount of input wattage required to operate in the second power mode;
 determine that adding the third wattage to the sum of the first power wattage and the second power wattage equals or exceeds the second amount of input wattage required to operate in the second power mode; and
 in response to determining that adding the third wattage to the sum of the first power wattage and the second power wattage equals or exceeds the second amount of input wattage required to operate in the second power mode, draw, from the third power sourcing device, an amount of wattage that, when added to the sum of the first power wattage and the second power wattage, equals the second amount of input wattage required to operate in the second power mode; and
 transition the powered device while operating in the first power mode directly to the second power mode, wherein the first power mode is a low-power mode and the second power mode is a high-power mode.

11. The system of claim 10, wherein the control circuitry is further configured to:
 determine that the second Ethernet link has failed;
 determine that the powered device does not require more wattage than the first wattage; and
 in response to determining that the powered device does not require more wattage than the first wattage, draw an amount of wattage up to the first wattage from the first power sourcing device to the powered device.

12. The system of claim 11, wherein the powered device was operating in the second power mode before the second Ethernet link failed, and wherein the control circuitry is further configured, in response to determining that the powered device does require more wattage than the first wattage, to:
 determine that the first power mode does not require more wattage than the first wattage; and
 in response to determining that the first power mode does not require more wattage than the first wattage, draw an amount of wattage from the first power sourcing device to the powered device that is required for the powered device to operate in the first power mode.

13. The system of claim 11, wherein the control circuitry is further configured to:
 determine that the second Ethernet link is repaired; and
 in response to determining that the second Ethernet link is repaired, activate the second power mode by drawing power from the first power sourcing device and the second power sourcing device.

14. The method of claim 1, wherein the first Ethernet link operates according to a communication protocol selected from a group consisting of an Institute of Electrical and Electronics Engineers (IEEE) 802.3af standard, a IEEE 802.at standard, and a IEEE 802.3bt standard.

15. The method of claim 1, further comprising:
 determining, by the powered device, a number of power sourcing devices connected to the powered device; and
 wherein the drawing from the first power sourcing device to the first port of the powered device further comprises drawing, by the powered device from the first power sourcing device to the first port of the powered device and over the first Ethernet link, the first wattage based on the determined number of power sourcing devices.

16. The system of claim 6, wherein the first power mode is a low-power mode and the second power mode is a high-power mode, and wherein the control circuitry is further configured to:
 determine that the second Ethernet link has failed, wherein the powered device operates in the second power mode before the second Ethernet link failed;
 determine that the powered device, in the second power mode, requires more wattage than the detected maximum first wattage;
 determine that the powered device, in the first power mode, does not require more wattage than the detected maximum first wattage; and
 in response to determining that the powered device does not require more wattage than the detected maximum first wattage, draw an amount of wattage from the first power sourcing device to the powered device that is required for the powered device to operate in the first power mode.

17. The system of claim 6, wherein the first Ethernet link operates according to a communication protocol selected from a group consisting of an Institute of Electrical and Electronics Engineers (IEEE) 802.3af standard, a IEEE 802.at standard, and a IEEE 802.3bt standard.

18. The system of claim 6, wherein the control circuitry is further configured to:
 determine a number of power sourcing devices connected to the powered device; and
 wherein to draw from the first power sourcing device to the first port of the powered device, the control circuitry is further configured to draw, from the first power sourcing device to the first port of the powered device and over the first Ethernet link, the first wattage based on the determined number of power sourcing devices.

19. The system of claim 10, wherein the first power mode is a low-power mode and the second power mode is a high-power mode, and wherein the control circuitry is further configured to:
 determine that the second Ethernet link has failed, wherein the powered device operates in the second power mode before the second Ethernet link failed;
 determine that the powered device in the second power mode, requires more wattage than the detected maximum first wattage;
 determine that the powered device in the first power mode, does not require more wattage than the detected maximum first wattage; and
 in response to determining that the powered device, does not require more wattage than the detected maximum first wattage, draw an amount of wattage from the first power sourcing device to the powered device that is required for the powered device to operate in the first power mode.

20. The system of claim 10, wherein the first Ethernet link operates according to a communication protocol selected from a group consisting of an Institute of Electrical and Electronics Engineers (IEEE) 802.3af standard, a IEEE 802.at standard, and a IEEE 802.3bt standard.

21. The system of claim 10, wherein the control circuitry is further configured to:
    determine a number of power sourcing devices connected to the powered device; and
    wherein to draw from the first power sourcing device to the first port of the powered device, the control circuitry is further configured to draw, from the first power sourcing device to the first port of the powered device and over the first Ethernet link, the first wattage based on the determined number of power sourcing devices.

* * * * *